United States Patent [19]
Lee

[11] Patent Number: 5,568,625
[45] Date of Patent: Oct. 22, 1996

[54] TIME CONVERSION METHOD OF MINI DISCS USING MULTIPLE TIME TABLES

[75] Inventor: Dong-Jin Lee, Kwangmyeong, Rep. of Korea

[73] Assignee: Samsung Electronics Co., Ltd., Kyungki-do, Rep. of Korea

[21] Appl. No.: 331,740

[22] Filed: Oct. 31, 1994

[30] Foreign Application Priority Data

Oct. 29, 1993 [KR] Rep. of Korea .................. 22748/1993

[51] Int. Cl.⁶ .................................................. G11B 7/00
[52] U.S. Cl. ............................................. 395/404; 369/41
[58] Field of Search ................................ 369/24, 30, 41; 395/421.11, 404

[56] References Cited

U.S. PATENT DOCUMENTS

5,132,947 7/1992 Kameda et al. ........................ 369/92

*Primary Examiner*—Eddie P. Chan
*Assistant Examiner*—Kevin L. Ellis
*Attorney, Agent, or Firm*—Sughrue, Mion, Zinn, Macpeak & Seas

[57] ABSTRACT

A method for converting position data of a mini disc into corresponding regenerating time data of a cluster and a sector in the mini disc system. The method having a first step of converting time by using a time table based on the cluster word and a second step of converting time by using a time table based on the sector byte. The first step further includes the steps of dividing the cluster word into the upper and lower bytes, respectively, creating a first time table corresponding to the upper byte of the cluster and a second time table corresponding to the lower byte of the cluster, and obtaining converted time corresponding to the upper and lower bytes of the cluster in the first and second time tables. The converted time, which is represented in predetermined time units, is generated by adding the converted time for each of the upper and lower bytes of the cluster, and the converted time for the sector byte.

8 Claims, 8 Drawing Sheets

| DATA FORM | MIN, SEC, MSEC | CLUSTER NUMBER | THE CONVERTED TIME |
|---|---|---|---|
| .DATA.B | H'00,H'00, 000 | 0 [H' 0] | 0 MIN 0 SEC |
| .DATA.B | H'00,H'02, 040 | 1 [H' 1] | 0 MIN 2 SEC |
| .DATA.B | H'00,H'04, 090 | 2 [H' 2] | 0 MIN 4 SEC |
| .DATA.B | H'00,H'06, 130 | 3 [H' 3] | 0 MIN 6 SEC |
| .DATA.B | H'00,H'08, 180 | 4 [H' 4] | 0 MIN 8 SEC |
| .DATA.B | H'00,H'0A, 220 | 5 [H' 5] | 0 MIN 10 SEC |
| .DATA.B | H'00,H'0C, 260 | 6 [H' 6] | 0 MIN 12 SEC |
| .DATA.B | H'00,H'0E, 310 | 7 [H' 7] | 0 MIN 14 SEC |
| .DATA.B | H,00,H'10, 350 | 8 [H' 8] | 0 MIN 16 SEC |
| .DATA.B | H'00,H'12, 400 | 9 [H' 9] | 0 MIN 18 SEC |
| .DATA.B | H'00,H'14, 440 | 10 [H' A] | 0 MIN 20 SEC |
| .DATA.B | H'00,H'16, 480 | 11 [H' B] | 0 MIN 22 SEC |
| .DATA.B | H'00,H'18, 530 | 12 [H' C] | 0 MIN 24 SEC |
| .DATA.B | H'00,H'1A, 570 | 13 [H' D] | 0 MIN 26 SEC |
| .DATA.B | H'00,H'1C, 620 | 14 [H' E] | 0 MIN 28 SEC |
| .DATA.B | H'00,H'1E, 660 | 15 [H' F] | 0 MIN 30 SEC |
| ⋮ | ⋮ | ⋮ | ⋮ |
| .DATA.B | H'74,H'38, 400 | 2191 [H'088f] | 74 MIN 38 SEC |
| .DATA.B | H'74,H'40, 450 | 2192 [H'0890] | 74 MIN 40 SEC |
| .DATA.B | H'74,H'42, 490 | 2193 [H'0891] | 74 MIN 42 SEC |
| .DATA.B | H'74,H'44, 540 | 2194 [H'0892] | 74 MIN 44 SEC |
| .DATA.B | H'74,H'46, 580 | 2195 [H'0893] | 74 MIN 46 SEC |
| .DATA.B | H'74,H'48, 620 | 2196 [H'0894] | 74 MIN 48 SEC |
| .DATA.B | H'74,H'50, 670 | 2197 [H'0895] | 74 MIN 50 SEC |
| .DATA.B | H'74,H'52, 710 | 2198 [H'0896] | 74 MIN 52 SEC |
| .DATA.B | H'74,H'54, 760 | 2199 [H'0897] | 74 MIN 54 SEC |
| .DATA.B | H'74,H'56, 800 | 2200 [H'0898] | 74 MIN 56 SEC |
| .DATA.B | H'74,H'58, 840 | 2201 [H'0899] | 74 MIN 58 SEC |
| ⋮ | ⋮ | ⋮ | ⋮ |

*FIG. 4*

| DATA FORM | SEC, MSEC | SECTOR NO. | |
|---|---|---|---|
| .DATA. B | 00, 000 | 0 | [H'00] |
| .DATA. B | 00, 060 | 1 | [H'01] |
| .DATA. B | 00, 120 | 2 | [H'02] |
| .DATA. B | 00, 190 | 3 | [H'03] |
| .DATA. B | 00, 250 | 4 | [H'04] |
| .DATA. B | 00, 310 | 5 | [H'05] |
| .DATA. B | 00, 380 | 6 | [H'06] |
| .DATA. B | 00, 440 | 7 | [H'07] |
| .DATA. B | 00, 510 | 8 | [H'08] |
| .DATA. B | 00, 570 | 9 | [H'09] |
| .DATA. B | 00, 630 | 10 | [H'0A] |
| .DATA. B | 00, 700 | 11 | [H'0B] |
| .DATA. B | 00, 760 | 12 | [H'0C] |
| .DATA. B | 00, 830 | 13 | [H'0D] |
| .DATA. B | 00, 890 | 14 | [H'0E] |
| .DATA. B | 00, 950 | 15 | [H'0F] |
| .DATA. B | 01, 020 | 16 | [H'10] |
| .DATA. B | 01, 080 | 17 | [H'11] |
| .DATA. B | 01, 140 | 18 | [H'12] |
| .DATA. B | 01, 210 | 19 | [H'13] |
| .DATA. B | 01, 270 | 20 | [H'14] |
| .DATA. B | 01, 340 | 21 | [H'15] |
| .DATA. B | 01, 400 | 22 | [H'16] |
| .DATA. B | 01, 460 | 23 | [H'17] |
| .DATA. B | 01, 530 | 24 | [H'18] |
| .DATA. B | 01, 590 | 25 | [H'19] |
| .DATA. B | 01, 660 | 26 | [H'1A] |
| .DATA. B | 01, 720 | 27 | [H'1B] |
| .DATA. B | 01, 780 | 28 | [H'1C] |
| .DATA. B | 01, 850 | 29 | [H'1D] |
| .DATA. B | 01, 910 | 30 | [H'1E] |
| .DATA. B | 01, 970 | 31 | [H'1F] |

| DATA FORM | MIN, SEC, MSEC | CLUSTER NUMBER | THE CONVERTED TIME |
|---|---|---|---|
| .DATA.B | H'00,H'00, 000 | 000 [H'0000] | 0 MIN 0 SEC |
| .DATA.B | H'08,H'2B, 260 | 256 [H'0100] | 8 MIN 43 SEC |
| .DATA.B | H'11,H'1A, 530 | 512 [H'0200] | 17 MIN 26 SEC |
| .DATA.B | H'1A,H'09, 790 | 768 [H'0300] | 26 MIN 9 SEC |
| .DATA.B | H'22,H'35, 060 | 1024 [H'0400] | 34 MIN 53 SEC |
| .DATA.B | H'2B,H'24, 320 | 1280 [H'0500] | 43 MIN 36 SEC |
| .DATA.B | H'34,H'13, 580 | 1536 [H'0600] | 52 MIN 19 SEC |
| .DATA.B | H'3D,H'02, 850 | 1792 [H'0700] | 61 MIN 2 SEC |
| .DATA.B | H,45,H'2E, 110 | 2048 [H'0800] | 69 MIN 46 SEC |

*FIG. 7*

| DATA FORM | MIN, SEC, MSEC | CLUSTER NUMBER | THE CONVERTED TIME |
|---|---|---|---|
| .DATA.B | H'00,H'00, 000 | 0 [H'00] | 0 MIN 0 SEC |
| .DATA.B | H'00,H'02, 040 | 1 [H'01] | 0 MIN 2 SEC |
| .DATA.B | H'00,H'04, 090 | 2 [H'02] | 0 MIN 4 SEC |
| .DATA.B | H'00,H'06, 130 | 3 [H'03] | 0 MIN 6 SEC |
| .DATA.B | H'00,H'08, 180 | 4 [H'04] | 0 MIN 8 SEC |
| .DATA.B | H'00,H'0A, 220 | 5 [H'05] | 0 MIN 10 SEC |
| .DATA.B | H'00,H'0C, 260 | 6 [H'06] | 0 MIN 12 SEC |
| .DATA.B | H'00,H'0E, 310 | 7 [H'07] | 0 MIN 14 SEC |
| .DATA.B | H,00,H'10, 350 | 8 [H'08] | 0 MIN 16 SEC |
| .DATA.B | H'00,H'12, 400 | 9 [H'09] | 0 MIN 18 SEC |
| .DATA.B | H'00,H'14, 440 | 10 [H'AA] | 0 MIN 20 SEC |
| .DATA.B | H'00,H'16, 480 | 11 [H'BB] | 0 MIN 22 SEC |
| .DATA.B | H'00,H'18, 530 | 12 [H'CC] | 0 MIN 24 SEC |
| .DATA.B | H'00,H'1A, 570 | 13 [H'DD] | 0 MIN 26 SEC |
| .DATA.B | H'00,H'1C, 620 | 14 [H'EE] | 0 MIN 28 SEC |
| .DATA.B | H'00,H'1E, 660 | 15 [H'FF] | 0 MIN 30 SEC |
| .DATA.B | H'00,H'20, 700 | 16 [H'10] | 0 MIN 32 SEC |
| ⋮ | ⋮ | ⋮ | ⋮ |
| .DATA.B | H'08,H'18, 870 | 247 [H'F7] | 8 MIN 24 SEC |
| .DATA.B | H'08,H'1A, 910 | 248 [H'F8] | 8 MIN 26 SEC |
| .DATA.B | H'08,H'1C, 960 | 249 [H'F9] | 8 MIN 28 SEC |
| .DATA.B | H'08,H'1F, 000 | 250 [H'FA] | 8 MIN 31 SEC |
| .DATA.B | H'08,H'21, 040 | 251 [H'FB] | 8 MIN 33 SEC |
| .DATA.B | H'08,H'23, 090 | 252 [H'FC] | 8 MIN 35 SEC |
| .DATA.B | H'08,H'25, 130 | 253 [H'FD] | 8 MIN 37 SEC |
| .DATA.B | H'08,H'27, 180 | 254 [H'FE] | 8 MIN 39 SEC |
| .DATA.B | H'08,H'29, 220 | 255 [H'FF] | 8 MIN 41 SEC |

*FIG.8*

TIME CONVERSION METHOD OF MINI DISCS USING MULTIPLE TIME TABLES

BACKGROUND OF THE INVENTION

The present invention relates to a mini disc system, and more particularly to a method for converting position data of a cluster and a sector of the mini disc into corresponding time data.

In a conventional mini disc system, a mini disc has storage clusters, which contain sectors. Further, addresses for the clusters and sectors are recorded on the mini disc, however, however, no corresponding time information is recorded on the mini disc. Although time information is not recorded on the mini disk, it is possible to provide a; user with corresponding time information by the mini disc system performing a conversion operation to convert the position information of the mini disc to time information. This is unlike a general Compact Disc (CD) which has time information recorded on a disc thereof. Therefore, in order to obtain time information for a mini disc, it is necessary to convert the mini disc address information into the corresponding time information.

In order to perform the address to time conversion, a conventional mini disc system employs a time table. The time table consists of cluster numbers each having a word length of 2 bytes. Because of this structure, a large amount of memory capacity is required and assigned to a microcomputer ROM, causing an increase in the required ROM storage. Therefore, in accordance with the increase of the size of the ROM, problems arise in which the cost per mini disc system becomes high and the program size of programs used in the microcomputer are limited.

Figure 1:
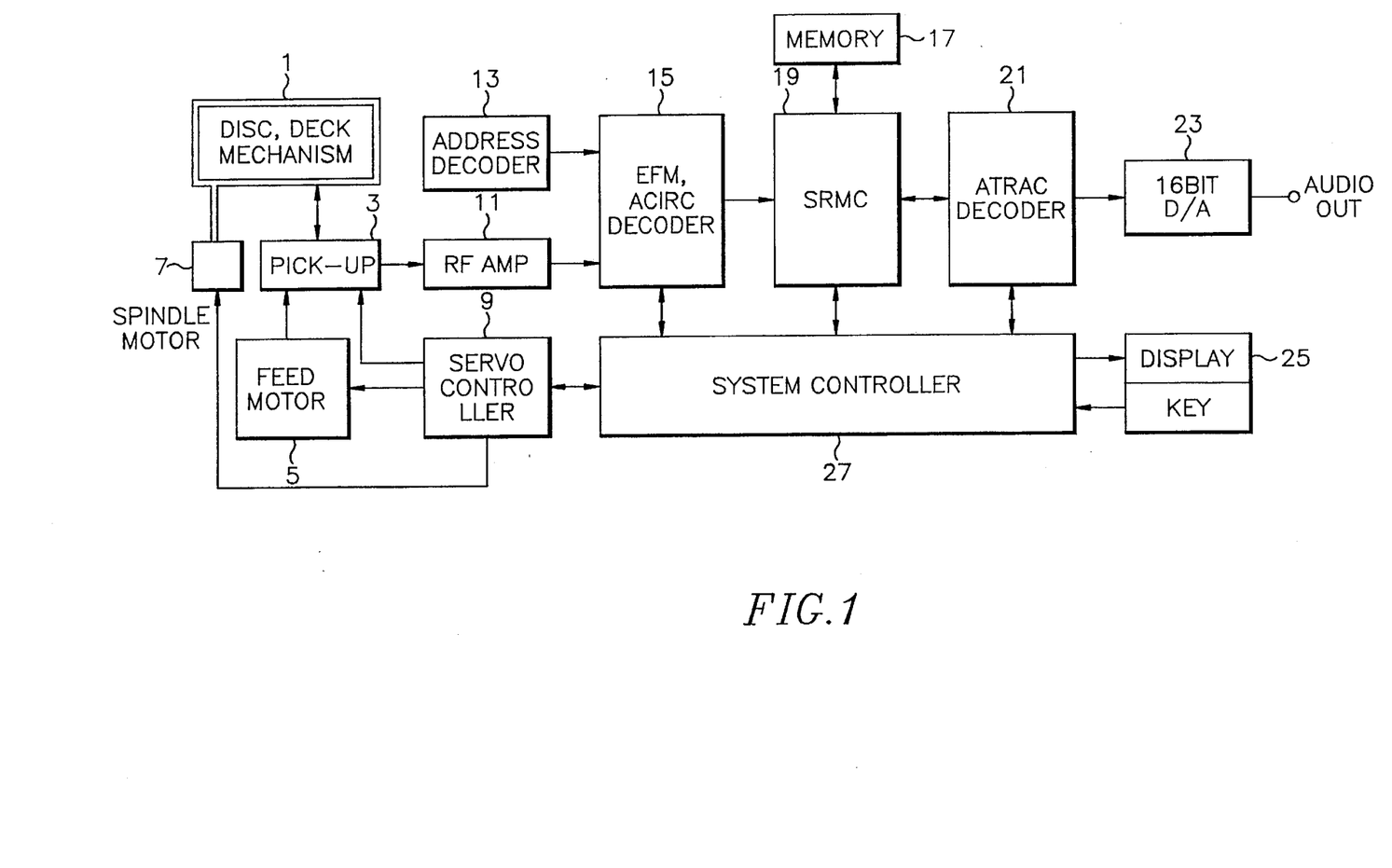
FIG. 1 is a block diagram of a conventional mini disc regenerating device.

FIG. 1 shows a block diagram of a conventional mini disc regenerating device.

A servo 9 is controlled to drive a feed motor 5 and a spindle motor 7 in response to a control signal from a system controller 27. A pick-up 3 reads a radio frequency (RF) signal from a rotating mini disc 1. An RF amplifier 11 amplifies the RF signal output from the pick-up 3 to a predetermined level. An Eight-to-Fourteen Modulation (EFM) and an Adaptive Cross Interleave Reed-Solomon Code (ACRIC) decoder 15, having a structure similar to a conventional CD signal processor, demodulates the output signal of the RF amplifier 11 and then stores the demodulated signal in memory 17 as digital data. The memory 17 is controlled by a Shock Resistance Memory Controller (SRMC) 19. The digital data, the cluster address consisting of one word, i.e., 2 bytes, and the sector address consisting of 1 byte, are included in the memory 17, respectively. Further, an error flag indicating whether or not the corresponding digital data is in error, is included in the digital data. The digital data stored in the memory 17 is output to an Adaptive Transform Acoustic Coding (ATRAC) decoder 21 by a sound group of 212 bytes via the SRMC 19 under the control of SRMC 19 receiving a data request signal from the ATRAC decoder 21. At this time, the error flag indicating whether or not the corresponding digital data is in error is also output with the digital data. The ATRAC decoder 21, applied via the SRMC 19, extends data of the sound group unit to the original data and then outputs the data to a digital/analog converter 23. When the digital data is applied to the ATRAC decoder 21, the cluster and sector addresses stored in memory 17 are output to system controller 27, e.g., a microprocessor, under the control of SRMC 19. The system controller 27 controls the servo controller 9, the EFM decoder 15, the SRMC 19, the ATRAC decoder 21, and a display/key input device 25.

Figure 2:
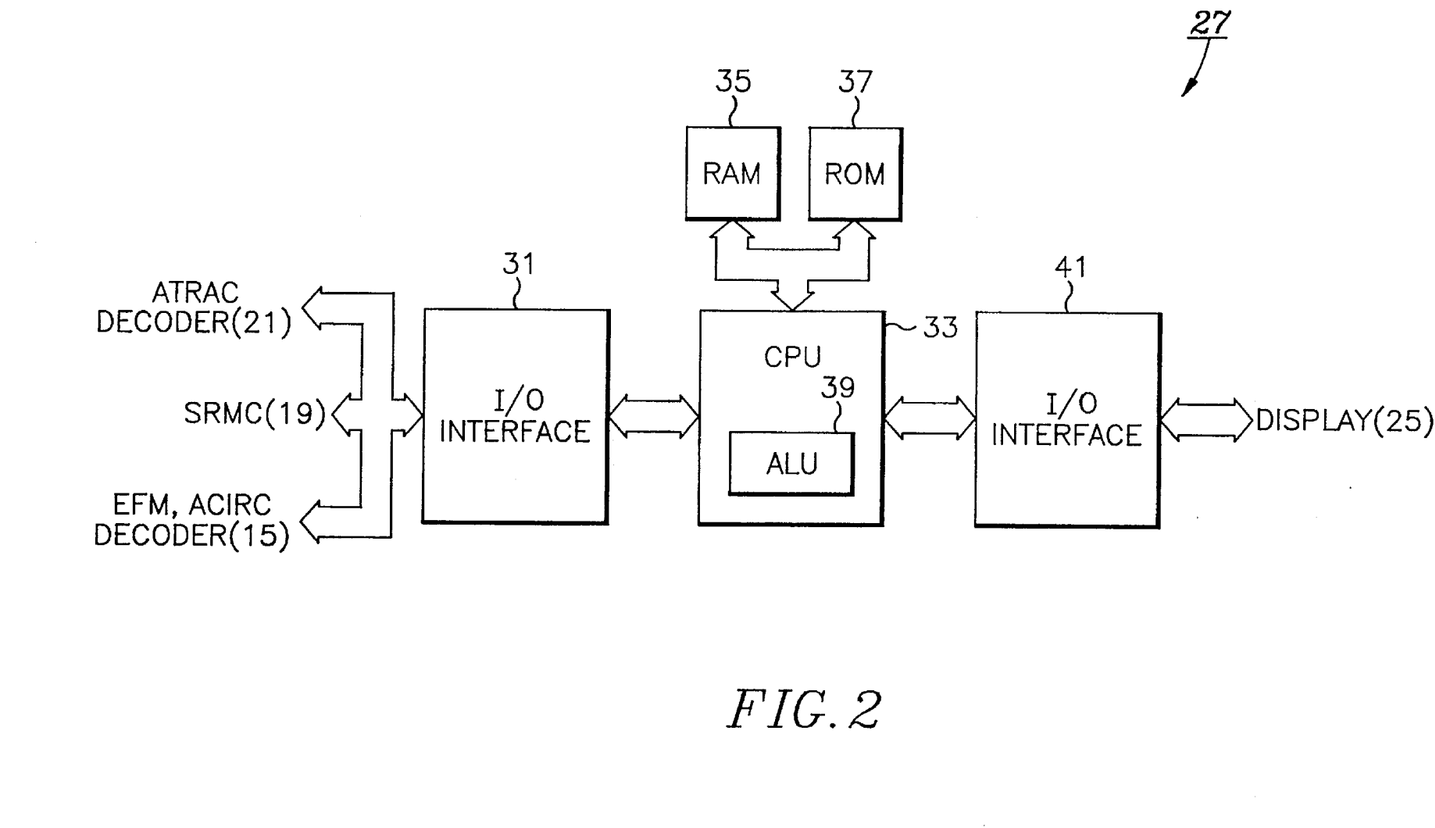
FIG. 2 is a detailed block diagram of system controller 27 which is shown in FIG. 1.

FIG. 2 is a detailed structural view of system controller 27. An I/O interface 31 interfaces the address output from SRMC 19 and various data inputs and outputs between the EFM and ACRIC decoder 15 and ATRAC decoder 21 to a CPU 33. The CPU 33 controls a RAM 35, a ROM 37, and an Arithmetic and Logic unit (ALU) 39: Cluster and sector addresses applied via the SRMC 19 are stored in the RAM 35 by the CPU 33. These cluster addresses which consist of a word having 2 bytes, and sector addresses consisting of 1 byte, which are stored in RAM 35, are the same as the addresses stored in memory 17. The time tables which convert the address stored in RAM 35 into time information, are stored in ROM 37. The ALU 39 generates time information by adding the time unit information from the time tables stored in ROM 37, which effectively perform time conversion. An I/O interface 41 outputs the time information, which is added in the ALU 38 under the control of CPU 33, to display 25. Thus, the display 25 displays the current time information of the mini disc system.

Figure 3:
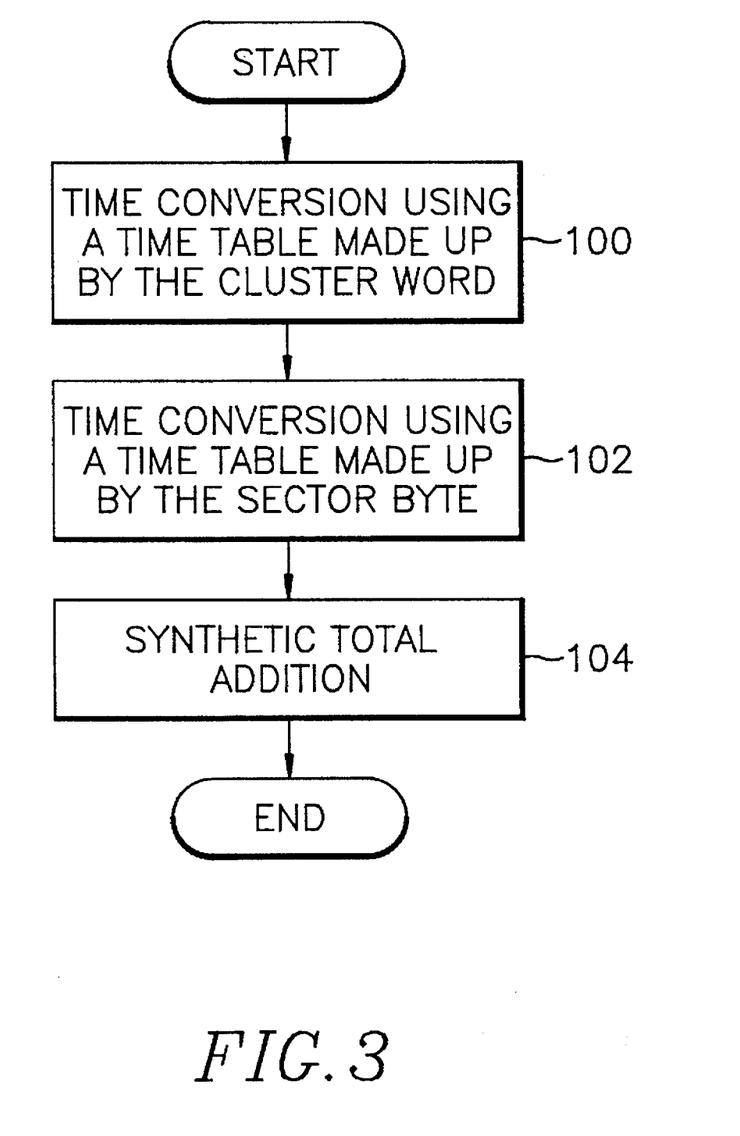
FIG. 3 is a flow chart showing a conventional time conversion method.

FIG. 3 shows a flow chart of the conventional time conversion method which is performed within the system controller 27 of the mini disc regenerating device.

Figure 4:
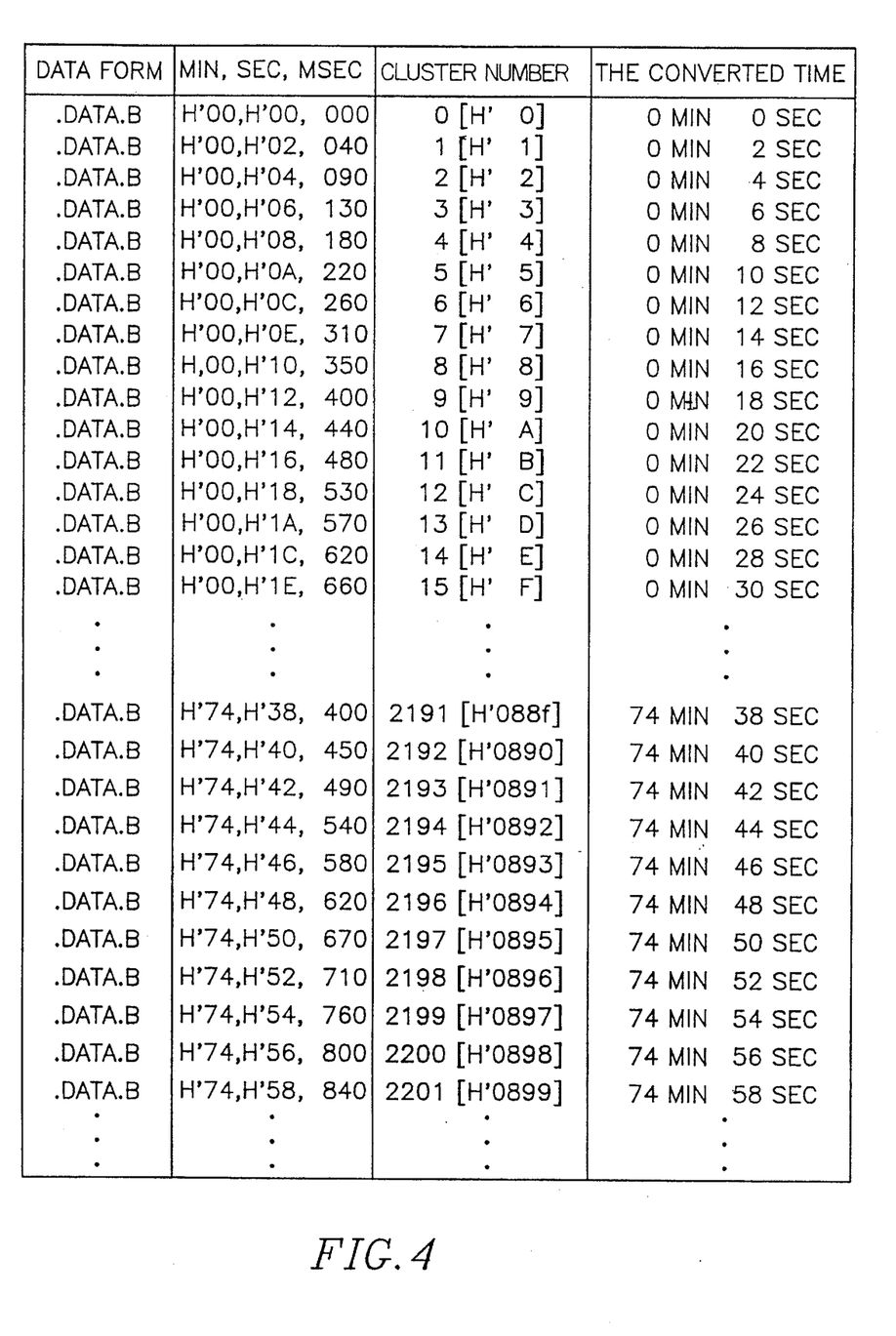
FIG. 4 is a conventional time table chart for performing time conversion based on a conventional cluster.

FIG. 4 shows a conventional time table chart formed based on cluster words, in ROM 37 of the system controller 27, for converting position data into time data.

Figure 5:
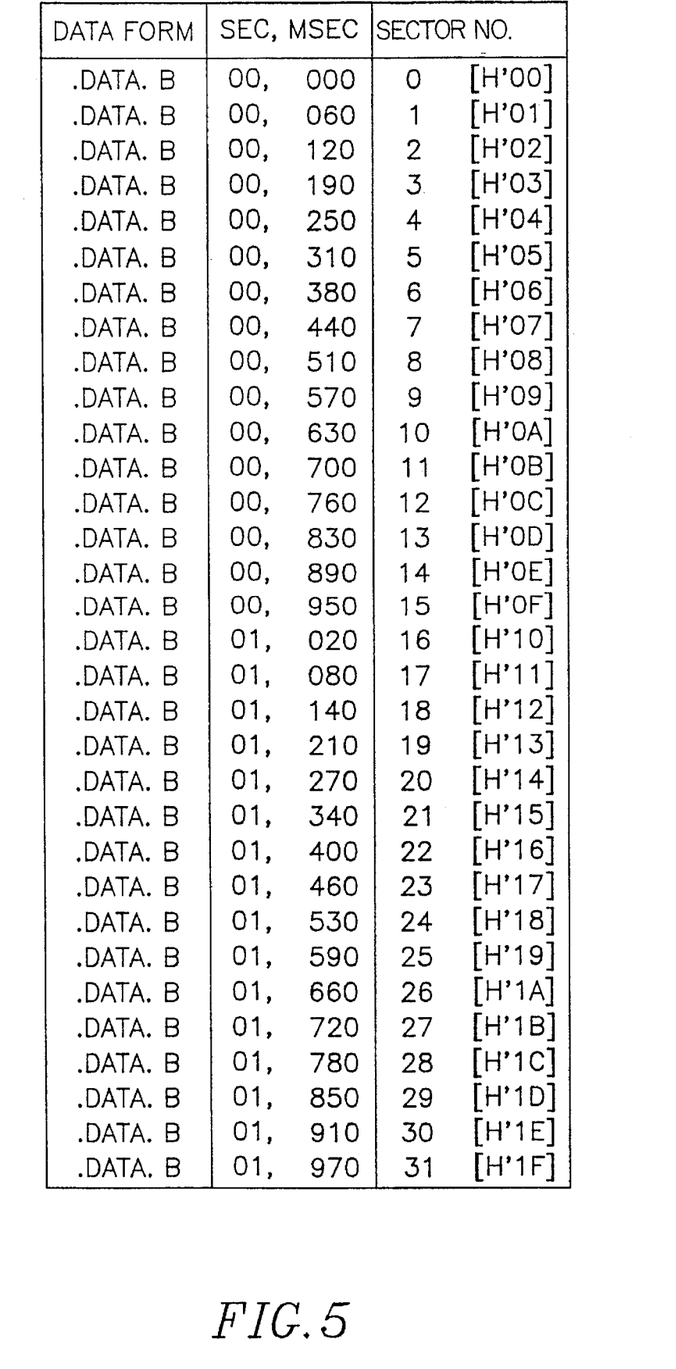
FIG. 5 is a conventional time table chart for performing time conversion based on a sector number according to both a conventional mini disc system and the present invention.

FIG. 5 shows a time table chart formed based on sector bytes, in ROM 37 for converting position data into time data.

As shown in FIGS. 4 and 5, 3 bytes of data representing minute, second, and millisecond values that correspond to a particular mini disc cluster are stored in ROM 35. Further, 2 bytes of data representing second and millisecond values that correspond to a particular sector are also stored in ROM 35. The symbol H' shown in the time tables of FIGS. 4 and 5 indicates that the numeral following the symbol is represented as a hexadecimal number.

Referring to FIGS. 2, 3, 4, and 5, the conventional time conversion method of a mini disc is explained.

As shown in FIG. 4, CPU 33 detects the input cluster and sector addresses, or numbers, which are stored in RAM 35. In step 100 CPU 33 then converts the cluster numbers, which are represented by one cluster word that is 2 bytes long, which represent position information of the mini disc, to corresponding time information by using the time table based on cluster words and containing time entries which are stored in ROM 37. In other words, the conventional time table which is based on cluster words, is based on a full cluster word, i.e., 2 bytes, and hence contains data entries for each and every cluster of the mini disc. Further, in step 102, as shown in FIG. 5, CPU 33 converts the corresponding sector number within the cluster to time information by using the time table based on sector numbers and containing corresponding time entries. In step 104, ALU 39 of CPU 33 converts the position information of the mini disc to time information by adding the converted time of the cluster consisting of minutes, seconds, milliseconds generated in step 100, to the converted time of the sector number consisting of seconds and milliseconds generated in step 102. This converted time information is sent to display 25 through the I/O interface 41 for display.

SUMMARY OF THE INVENTION

It is therefore an object of the present invention to provide a time conversion method by creating a time table for use in time conversion, in which the size of a microcomputer ROM which contains the time table, is reduced.

In order to obtain the object of the present invention, the method according to the present invention comprises the steps of dividing a cluster word into upper and lower bytes, respectively, creating a first time table corresponding to the upper byte and a second time table corresponding to the lower byte, obtaining a converted time corresponding to the upper and lower cluster bytes in the first and second time tables, respectively, and adding the converted times which are in predetermined time units.

BRIEF DESCRIPTION OF THE DRAWINGS

The above and other objects, advantages and features of the present invention will be more apparent from the following detailed description when considered with the attached drawings, in which.

DETAILED DESCRIPTION OF THE PREFERRED EMBODIMENT

According to the method for converting time of the time table based on the cluster word, as shown in FIG. 2, a converted time value for a particular cluster number of the mini disc is obtained by multiplying a corresponding time value per cluster (e.g., a value of about 2.04 seconds/cluster) by the cluster number of that cluster. The time table is formed for all of the clusters of the mini disc in which for each cluster number a corresponding time value is obtained. That is, for a first cluster 0 (zero) to the last cluster N, time values are obtained and sequentially stored in the single time table.

In a typical mini disc, it is impossible for the maximum number of clusters to exceed 2,303, which corresponds to H'8FF in a hexadecimal representation. If the number of clusters of the mini disc is H'8FF, the amount of data entries in the time table required to represent the number of clusters is the same as the total number of mini disc clusters. Therefore, the memory capacity required when ROM 37 is used to convert mini disc position to time in the system controller 27, is calculated as follows.

Memory capacity=H'8FF×3 bytes=6,909 bytes

Here, the number H'8FF indicates the number of clusters, i.e., the number of data entries in the time table. Further, 3 bytes of memory are required for each time table entry which represents a corresponding time for the particular cluster. The corresponding time for a cluster number includes data representing minutes, seconds, and milliseconds, each respectively requiring one byte of storage.

In the time table for converting a sector number byte to time information, as shown in FIG. 5, the converted time value of each of the sector numbers is obtained by multiplying the time value per sector (e.g., a value of about 64 milliseconds/sector) by the sector number. As is well known, since one cluster consists of 32 sectors in a mini disc, 32 data entries in the time table are required to represent all of the sectors within a cluster.

Since the time table in accordance with the present invention is generated after dividing cluster word into the upper and lower bytes, respectively, unlike the conventional time table, the time table is used in converting position data into time data.

Figure 7:
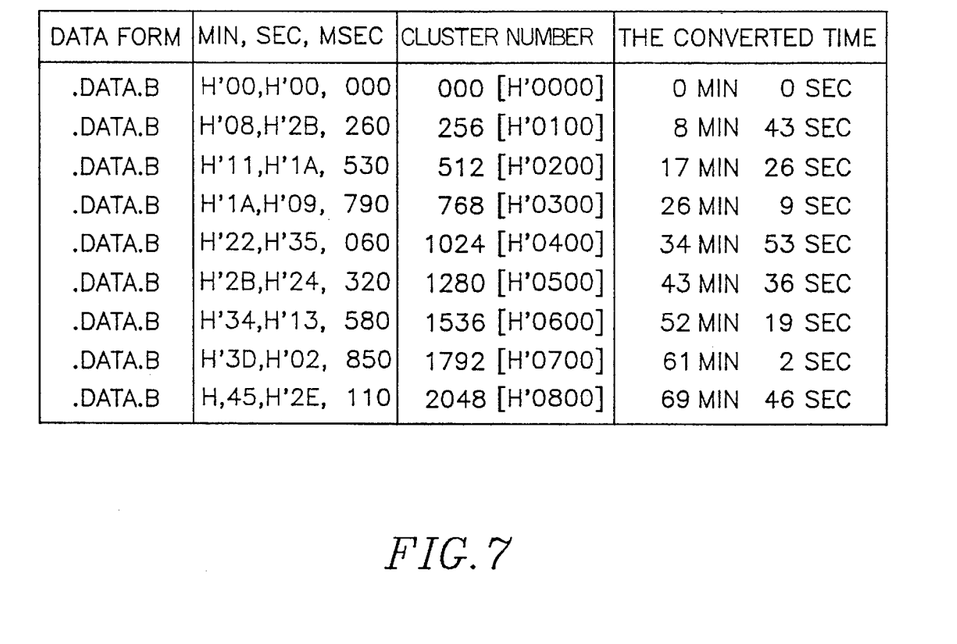
FIG. 7 is a time table chart for performing time conversion based on the upper cluster bytes, according to the present invention.
Figure 8:
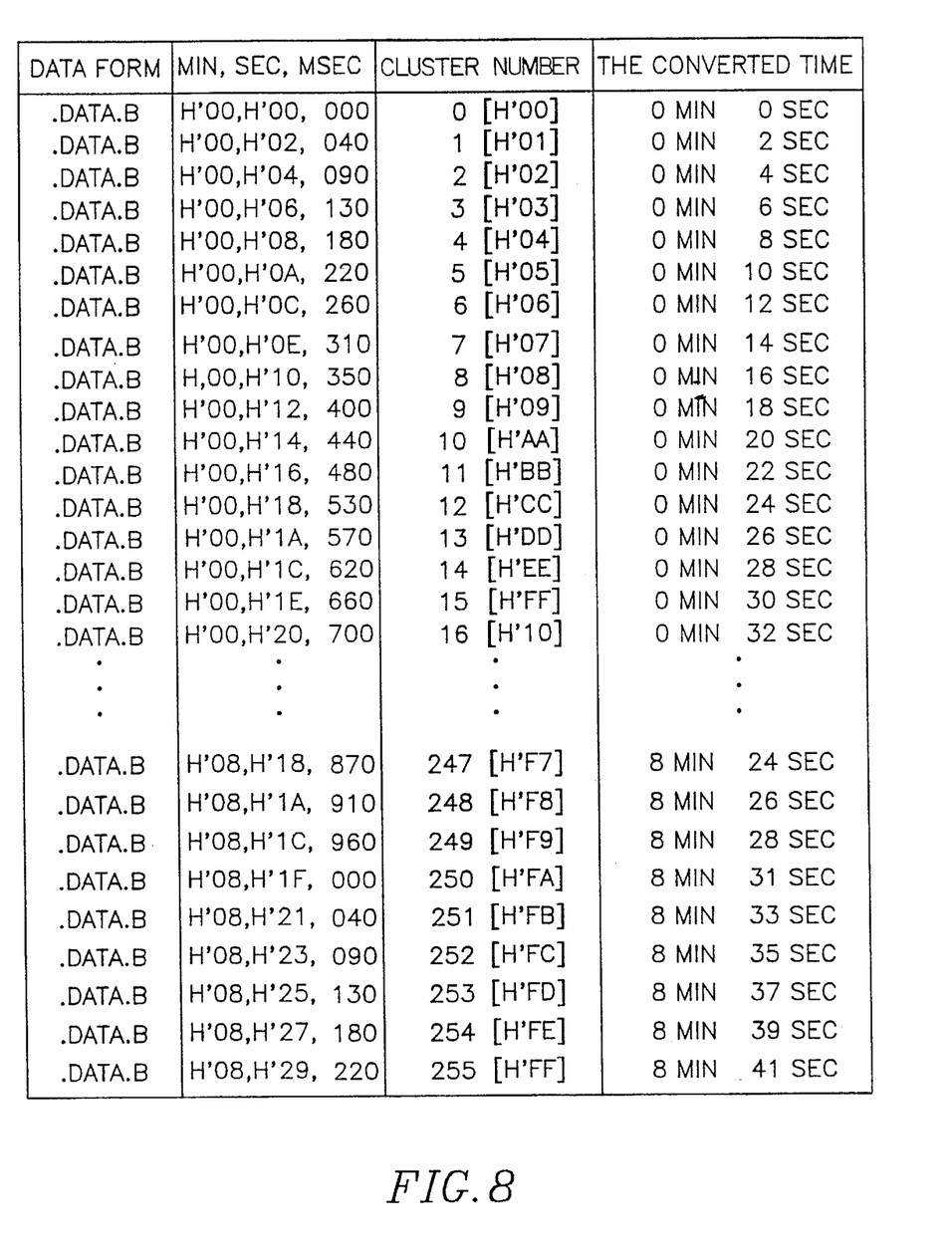
FIG. 8 is a time table chart for performing time conversion based on the lower cluster byte, according to the present invention.

FIG. 7 shows a time table chart based on the upper bytes of the cluster numbers according to the present invention. FIG. 8 shows a time table chart based on the lower bytes of the cluster numbers.

The time tables based on the cluster number upper and lower bytes, as shown in FIGS. 7 and 8 and the time table based on the sector number of a cluster, as shown in FIG. 5, are all stored in ROM 37 shown in FIG. 2.

FIG. 5 shows the time table based on the upper bytes of the cluster numbers. The method for preforming the time conversion is as follows.

The maximum regenerating time of a conventional mini disc is 74 minutes, i.e., 4,440 seconds. Therefore, the total number of clusters per mini disc is smaller than H'8FF. If the number of clusters on a mini disc were H'08FF, i.e., 2,303 in the decimal system, the regenerating time of the mini disc would be 2,303×2.04=4,698 seconds, however, 4,698 seconds somewhat exceeds the maximum regenerating time (4,440 seconds) of the mini disc. Therefore, the number of clusters per the mini disc is safely assumed to be H'08FF. As a result of such an assumption, the maximum number for the upper byte of a cluster number is H'08 and that for the lower byte is H'FF. Accordingly, the upper byte of the cluster number ranges in value from H'00 to H'08, and thus, a maximum of 9 table entries are needed to represent this range of values of the upper byte of the cluster number.

If the lower byte of the cluster number is increased from H'00 to H'FF, the upper byte is increased by 1. That is, the upper byte becomes H'01. Therefore, the fact that the upper byte is increased by 1 means that data of the lower byte is increased by 256 (i.e., H'00–H'FF). Accordingly, the time conversion preformed using the time table corresponding to the cluster number upper bytes is calculated as follows.

Time conversion=value of the upper byte×256×2,043 seconds

Here, the value of the upper byte ranges from H'00 to H'08. The numeral 256 is the number of clusters skipped over because only the cluster number upper byte is being converted. The 2,043 seconds represents the amount of regenerating time for one cluster. Since the calculated time conversion data is in units of seconds, the time conversion data is divided into minutes, seconds, and milliseconds, respectively, which are then stored in the time table for the cluster number upper byte, in ROM 37.

FIG. 8 shows the time table formed based on the cluster number lower byte according to the present invention. The lower byte requires 256 data entries ranging from H'00 to H'FF, i.e., 0 to 255. The time conversion corresponding to the time table based on the cluster number lower byte is calculated as follows.

Time conversion=value of the lower byte×2,043 seconds

Here, the lower byte has values of H'00 to H'FF. These values indicate integers between 0 to 255. The 2,043 second figure in the above equation represents the corresponding time value for one cluster. Since the calculated time conversion data is in units of seconds, the time conversion data is divided into units of minutes, seconds, and milliseconds, respectively, and then stored in the time table of ROM 37.

According to the present invention, the memory capacity required for a time table based on the upper and lower bytes of the cluster numbers and then stored in ROM 37 shown in FIG. 2, is obtained by the following calculation. As mentioned above, if the maximum number of clusters is H'8FF, the number of data entries required to represent the upper byte is 9, i.e., H'00 to H'08, and also the number of data entries required to represent the lower byte is 256, i.e., H'00 to H'FF. Therefore, the total number of data entries occupying the region of the memory is 265 (=9 +256) which is the sum of data entries included in the two time tables. The memory capacity in bytes is obtained is as follows.

Memory capacity=265×3 bytes=795 bytes

Here, the numeral 265 is the number of data entries, and the 3 byte figure is the memory capacity required for one data entry.

The time table based on the sector numbers, and stored in ROM 37 according to the present invention uses the conventional time table based on the sector numbers, as shown in FIG. 5.

Figure 6:
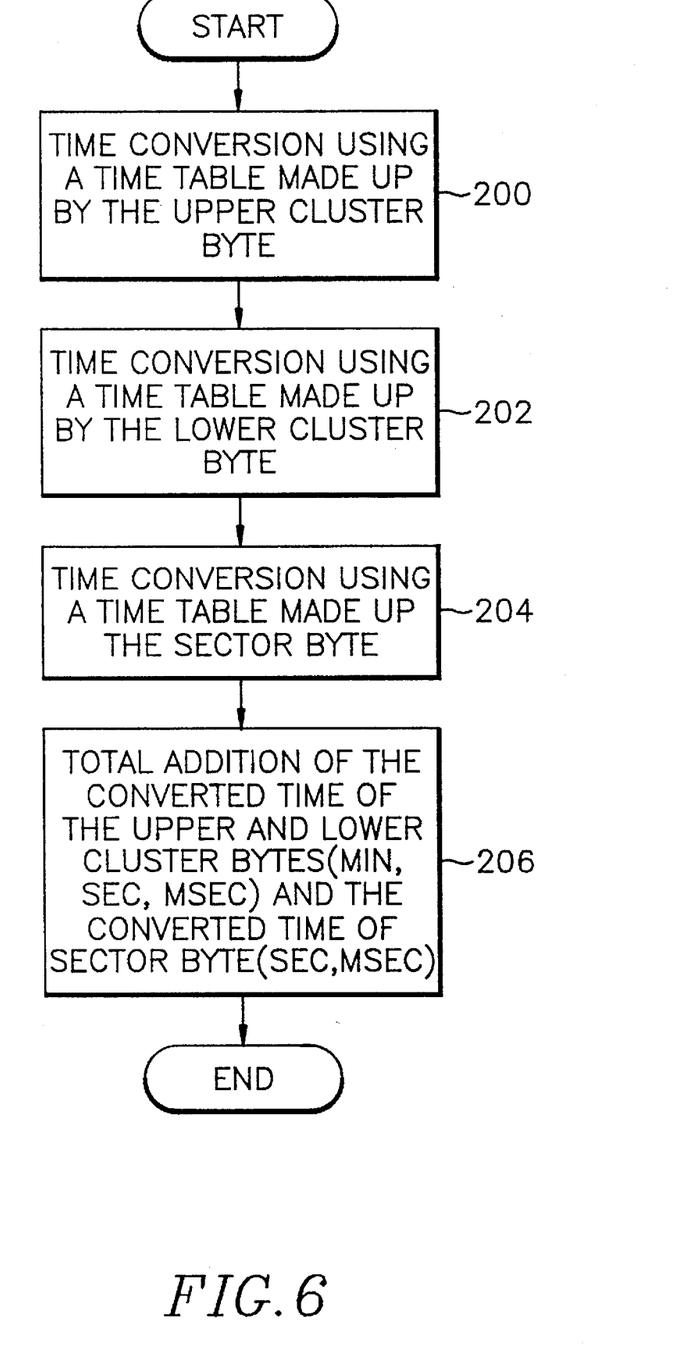
FIG. 6 is a flow chart showing a time conversion method according to the present invention.

FIG. 6 is a flow chart showing a time conversion method according to the present invention.

Referring to FIGS. 1, 2, and 6, the preferred embodiment of the present invention is explained below in detail, and in particular, the time table based on the sector number byte and the time table based on the cluster number upper and lower bytes, respectively.

The CPU 33 stores an address corresponding to data applied via the I/O interface 31 in the RAM 35. The address stored in the RAM 35 consists of the cluster number upper and lower bytes having 1 byte each and the sector number byte, which consists of 1 byte. Therefore, the address consists of a total of 3 bytes.

The upper and lower bytes of the cluster addresses and the sector address stored in RAM 35 are detected for converting position information into time information by CPU 33. The CPU 33 obtains the converted time corresponding to the cluster number upper byte by using the time table based on by the cluster number upper byte in step 200. In the next step 202, the CPU 33 obtains the converted time corresponding to the cluster number lower byte by using the time table based on the cluster number lower byte. The time converted by using the time tables shown in FIGS. 7 and 8 is in units of minutes, seconds, and milliseconds.

In step 206, CPU 33 obtains the converted time of the corresponding sector within the cluster by using the time table based on sector numbers. The time converted by using the time table shown in FIG. 5 is in units of seconds and milliseconds.

In steps 200, 202, and 206 above, the ALU 39 of CPU 33 adds the converted time of the cluster consisting of minutes, seconds, and milliseconds, to the converted time of Me sector consisting of seconds and milliseconds. The time added consists of units of minute/second. The converted time is sent to display 25 via the I/O interface 41, and thereafter displayed on display 25.

As described in the forgoing paragraphs of this detailed description, the two time tables according to the present invention are comprised of data entries based on the cluster word divided into the upper and lower bytes, respectively. Therefore, in order to store the time table in the ROM, the required memory capacity is only 795 bytes. This corresponds to only 12 percent of the conventional memory capacity which requires 6,909 bytes in order to store the time table in the ROM.

According to the present invention, since the size of the time table based on the cluster numbers and sector numbers which is actually used is about 759 bytes, unlike that of the conventional time table which is about 6,670 bytes in size. Thus, there arises an efficiency by reducing the size of the microprocessor program by about ⅛.

As discussed above, since the three time tables used for the time conversion method, the region of the microcomputer ROM required to store data, can be small. Furthermore, more ROM storage space is made available for program use in the limited microprocessor.

Further, the present invention is not intended to be limited to cluster words of only 2 bytes. Rather, the present invention includes cluster words of virtually any length, in which the cluster word can be divided to form a plurality of cluster word portions. Time tables are generated based on each of the cluster word portions to convert the particular cluster word portion to a corresponding converted time. The converted times for each cluster word portion are added together to form a total converted time. Hence, the storage space required for the time tables can be reduced for any size cluster word, according to the present invention. One of ordinary skill will understand that the method for converting position information to time information for a particular cluster portion follows along the lines of the method for converting an upper byte and lower byte of a cluster word to time, as set forth above.

What is claimed is:

1. A method for converting position data into time data for use in a mini disc drive system having a pick-up means for detecting the position data of the mini disc and having a plurality of time tables based on a cluster unit and a sector unit of the mini disc, said time tables each having a plurality of time data in sequence corresponding to the position data, said method comprising the steps of:

dividing said cluster unit into an upper portion and a lower portion, respectively;

creating a first time table corresponding to said upper portion, a second time table corresponding to said lower portion and a third time table corresponding to said sector unit, wherein each of said time tables has a plurality of data entries;

converting the position data detected by the pick-up means into first, second and third data by using said first, second, and third time tables, respectively; and adding said first, second, and third time data to produce the time data.

2. The method as set forth in claim 1, wherein said step of creating a first time table further comprises the steps of:

determining a maximum number of cluster units of the mini disc;

determining a number of entries in said first time table by dividing the maximum number of cluster units into an upper portion and a lower portion, and selecting an integer larger than or equal to a value represented by the upper portion of the maximum number of cluster units;

determining a time conversion value for each cluster unit represented by said upper portion, up to said determined number of entries, and sequentially storing said determined time conversion value in said first time table.

3. The method as set forth in claim 2, wherein said step of determining a time conversion value further comprises the steps of:

multiplying the upper portion of the cluster unit by a maximum value of the lower portion of the cluster unit to form a product, and multiplying the product by a predetermined regenerating time per cluster unit to form an upper portion time conversion value; and sequentially storing said upper portion time conversion value in said first time table.

4. The method as set forth in claim 1, wherein said step of creating a second time table comprises the steps of:

multiplying the lower portion of the cluster unit by a predetermined regenerating time per cluster unit to form a lower portion time conversion value; and sequentially storing said lower portion time conversion value in said second time table.

5. A method for converting position data into time data in a mini disc system as claimed in claim 3, wherein each of said cluster unit is represented by 2 bytes, and said upper portion is represented by one byte.

6. A method for converting position data into time data in a mini disc system as claimed in claim 4, wherein each of said cluster unit is represented by 2 bytes, and said lower portion is represented by one byte.

7. The method as set forth in claim 1, wherein said step of creating a third time table comprises the steps of:

multiplying the sector unit by a predetermined regenerating time per sector unit to form a sector unit time conversion value; and sequentially storing said sector unit time conversion value in said third time table.

8. A method for converting position data into time data in a mini disc system as claimed in claim 1, wherein a maximum number of data entries of said second time table corresponding to the lower portion is 255.

* * * * *